United States Patent
Hwang et al.

[11] Patent Number: 6,161,022
[45] Date of Patent: Dec. 12, 2000

[54] METHOD OF ADJUSTING A SIZE OF A BASE TRANSCEIVER STATION SEARCH WINDOW

[75] Inventors: Cheol-Ju Hwang, Kyoungki-do; Sang-Min Lee, Seoul, both of Rep. of Korea

[73] Assignee: Hyundai Electronics Ind. Co., Ltd., Kyoungki-do, Rep. of Korea

[21] Appl. No.: 09/220,230

[22] Filed: Dec. 23, 1998

[30] Foreign Application Priority Data

Dec. 29, 1997 [KR] Rep. of Korea ............ 97-77239

[51] Int. Cl.[7] .................................. H04B 1/38
[52] U.S. Cl. .................. 455/561; 455/434; 370/342; 370/347
[58] Field of Search .................. 455/561, 434, 455/453, 67.1, 515; 370/252, 335, 342, 347, 500

[56] References Cited

U.S. PATENT DOCUMENTS

| | | |
|---|---|---|
| 5,450,612 | 9/1995 | Chanroo et al. |
| 5,511,067 | 4/1996 | Miller ........................... 455/561 |
| 5,537,241 | 7/1996 | Fisher. |
| 5,577,022 | 11/1996 | Padovani ........................ 455/434 |
| 5,627,835 | 5/1997 | Witter. |
| 5,790,589 | 8/1998 | Hutchinson, IV et al. ........ 370/347 |
| 5,872,774 | 2/1999 | Wheatley, III et al. ........... 370/335 |
| 6,044,104 | 3/2000 | Watanabe ....................... 370/342 |

*Primary Examiner*—Nay Maung
*Assistant Examiner*—Quochien B. Vuong
*Attorney, Agent, or Firm*—Reed Smith Shaw & McClay LLP

[57] ABSTRACT

A method of adjusting a size of a base transceiver station (BTS) search window for adjusting the size of the search window, which the BTS uses to acquire a signal of a mobile station, according to a service radius and modifying a location of the search window, thereby improving efficiency in acquiring an access signal and controlling a service area. The method comprises the steps of: determining a service radius in which the BTS can acquire an access signal of a mobile station; reading a size of a preamble search window and a preamble search range corresponding to the determined service radius from a table used for determination of the size of the search window, the table being stored in a database; and modifying the size of the search window by changing search window parameters of the BTS system according to the read search range and the size of the search window for the preamble.

5 Claims, 4 Drawing Sheets

FIG. 4

| SERVICE RADIUS(km) | PROPAGATION DELAY(μs) | PROPAGATION DELAY(PN chips) | PROPAGATION TRIP DELAY(RTD) | Total RTD (PN chips) | Prem. Win Size (1/8 PN chips) |
|---|---|---|---|---|---|
| 1 | 3.33 | 4.1 | 8.2 | 40.1 | 61 |
| 2 | 6.67 | 8.2 | 46.4 | 48.3 | 127 |
| 3 | 10.00 | 12.3 | 24.6 | 56.5 | 192 |
| 4 | 13.33 | 16.4 | 32.8 | 64.7 | 258 |
| 5 | 16.67 | 20.5 | 41.0 | 72.9 | 323 |
| 6 | 20.00 | 24.6 | 49.2 | 81.1 | 389 |
| 7 | 23.33 | 28.7 | 57.3 | 89.3 | 454 |
| 8 | 26.67 | 32.8 | 65.5 | 97.5 | 520 |
| 9 | 30.00 | 36.9 | 73.7 | 105.7 | 585 |
| 10 | 33.33 | 41.0 | 81.9 | 113.9 | 651 |
| 11 | 36.67 | 45.1 | 90.1 | 122.1 | 716 |
| 12 | 40.00 | 49.2 | 98.3 | 130.3 | 782 |
| 13 | 43.33 | 53.2 | 106.5 | 138.4 | 848 |
| 14 | 46.67 | 57.3 | 114.7 | 146.6 | 913 |
| 15 | 50.00 | 61.4 | 122.9 | 154.8 | 979 |
| 16 | 53.33 | 65.5 | 131.1 | 163.0 | 1044 |
| 17 | 56.67 | 69.6 | 139.3 | 171.2 | 1110 |
| 18 | 60.00 | 73.7 | 147.5 | 179.4 | 1175 |
| 19 | 63.33 | 77.8 | 155.6 | 187.6 | 1241 |
| 20 | 66.67 | 81.9 | 163.8 | 195.8 | 1306 |
| 21 | 70.00 | 86.0 | 172.0 | 204.0 | 1372 |
| 22 | 73.33 | 90.1 | 180.2 | 212.2 | 1437 |
| 23 | 76.67 | 94.2 | 188.4 | 220.4 | 1503 |
| 24 | 80.00 | 98.3 | 196.6 | 228.6 | 1568 |
| 25 | 83.33 | 102.4 | 204.8 | 236.7 | 1634 |
| 26 | 86.67 | 106.5 | 213.0 | 244.9 | 1700 |
| 27 | 90.00 | 110.6 | 221.2 | 253.1 | 1765 |
| 28 | 93.33 | 114.7 | 229.4 | 261.3 | 1831 |
| 29 | 96.67 | 118.8 | 237.6 | 269.5 | 1896 |
| 30 | 100.00 | 122.9 | 245.8 | 277.7 | 1962 |

6,161,022

METHOD OF ADJUSTING A SIZE OF A BASE TRANSCEIVER STATION SEARCH WINDOW

BACKGROUND OF THE INVENTION

1. Field of the Invention

The present invention relates to a base transceiver station (BTS) in a code division multiple access (CDMA) system and more particularly to a method of adjusting a size of a BTS search window for adjusting a size of a search window, which a BTS uses to acquire a signal of a mobile station, according to a service radius of the BTS in digital mobile communications.

2. Description of Related Art

A conventional CDMA system is illustrated in FIG. 1. The CDMA system usually comprises: a mobile station (MS) 10 which is operable while a user is moving or staying at any site; a base transceiver station (BTS) for receiving a call process request from the MS 10 and transmitting a call transmission request from a base station controller (BSC) 30 to the MS 10; the BSC 30 for controlling signal process between the BTS 20 and a mobile switching center (MSC) 40; the MSC 40 for transmitting the call process request from the MS 10 via a public network or a private network to a public switching telephone network (PSTN) or an advanced mobile phone service (AMPS) and other communication networks under control of the BSC 30, effecting a personal communication system (PCS) service; a home location register/visitor location register (HLR/VLR) 50 coupled to the MSC 40 for storing location information of the MS 10 subscribed to the MSC 40 and location information of the MS 10 within a service radius of the MSC 40; a base station manager (BSM) 60 coupled to the BSC 30 and having BTS search window size parameter information, for managing the BSC 30; and a voice mail system/fax mail system (VMS/FMS) 70 coupled to the MSC 40 for switching voice information transmitted in the form of voice and fax information to perform a voice/fax information service.

In the CDMA system having such configuration, when a subscriber having the MS 10 and being within the service area of the MSC uses the PCS service, the MSC 40 recognizes a location of the MS 10 via the HLR/VLR 50 and, in turn, performs the voice/fax information service in response to a request of the MS 10 or connects the MS 10 to another network, thereby effecting the PCS service. The BSM 60, which is coupled to the BSC 30 and has the search window size parameter information for the BTS 20, loads the parameter information onto the BTS 20 at an initial stage to allow to establish the size of the search window.

In this CDMA system, the BTS 20 establishes a range of time for searching, namely a search window, used for acquiring signals forwarded by the MS 10 and finds an access preamble of the MS 10. FIG. 2 shows a structure of an access channel. An access probe comprises an access preamble and a message. The access preamble consists of serial 94 zeros and is used to aid the BTS 20 in acquiring the MS 10. The message contains information necessary for the access.

Since the access preamble of the MS 10 consists of 94 zeros, the BTS 20 finds the access preamble by checking the number of input zeros in such a manner that a searcher of the BTS 20 correlates input signals with a walsh symbol index 0.

According to conventional technology, the search window for acquisition of the signals from the MS 10 is set to a certain value (for example, 1280) regardless of the service radius of the BTS 20.

Since the BTS uses the search window having the same size at the same position regardless of the service radius of the BTS 20 when acquiring an access signal of the MS in the conventional system, the BTS 20 having a smaller service radius may search an unnecessary range when finding the MS 10, so it takes much time for the BTS 20 to acquire the access signal of the MS 10, thereby frequently failing in acquiring the access signal of the MS 10. Additionally, the BTS 20 having a large service radius may not provide the service for the MS 10 located near the boundary of its service area, thereby deteriorating the quality of the mobile communication service.

SUMMARY OF THE INVENTION

Accordingly, the present invention is directed to a BTS search window adjusting method that substantially obviates one or more of the limitations and disadvantages of the related art.

An objective of the present invention is to provide a BTS search window adjusting method, wherein a size of a search window is adjusted according to a service radius of a BTS and a location of the search window can be modified, thereby improving efficiency in acquiring an MS access signal and allowing adjustment of a service area.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, a BTS search window adjusting method comprises the steps of: determining a service radius in which the BTS can acquire an access signal of a mobile station; reading a size of a preamble search window and a preamble search range corresponding to the determined service radius from a table used for determination of the size of the search window, the table being stored in a database; and modifying the size of the search window by changing search window parameters of the BTS system according to the read search range and the size of the search window for the preamble.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a table showing delay times in a conventional CDMA mobile communication system and results of calculation of sizes and starting points of search windows according to service radiuses according to the present invention.

DETAILED DESCRIPTION OF PREFERRED EMBODIMENT

Reference will now be made in detail to the preferred embodiments of the present invention, examples of which are illustrated in the accompanying drawings.

The following concerns a detailed description on an embodiment according to technical ideas of a BTS search window adjusting method of the present invention.

Figure 3:
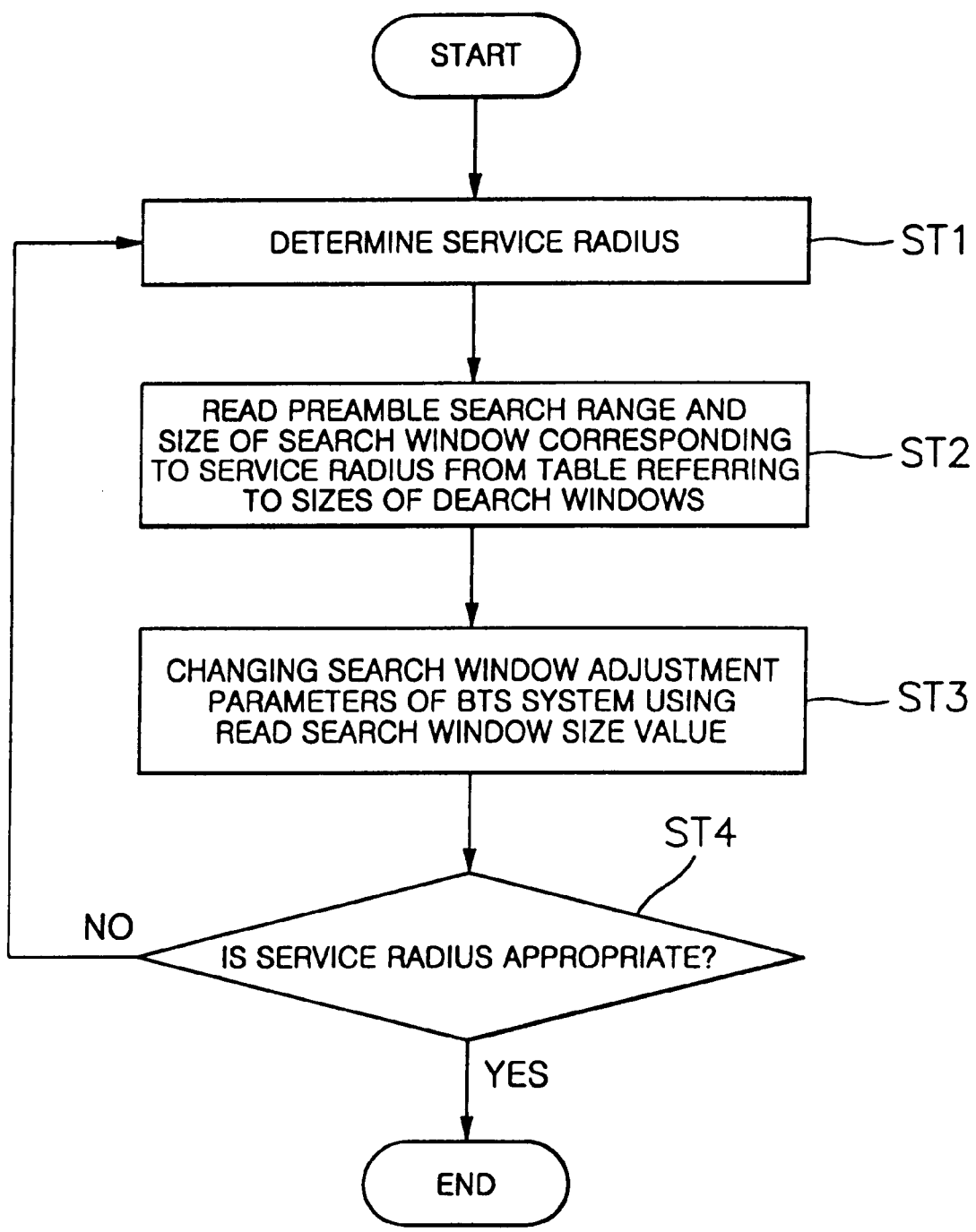
FIG. 3 is a flow chart of a BTS search window adjusting method according to the present invention.

As shown in FIG. 3, a method of adjusting a size of a BTS search window comprises the steps of: determining a service radius in which the BTS 20 can acquire an access signal of the MS 10 (ST1); reading a preamble search range and a size of a search window which correspond to the determined service radius from a table used for determination of the size of the search window (ST2), the table being stored in a database; and modifying the size of the search window by changing parameters of the BTS system according to the read preamble search range and the size of the search window (ST3).

With reference to the accompanying drawings, operations for effecting the BTS search window adjusting method according to the present invention will now be described.

In a digital mobile communication system employing a CDMA mode, the BTS 20 synchronizes its time with a CDMA system time. The MS 10 also synchronizes its time with the CDMA system time using time information provided by the BTS 20. The BTS 20 obtains the system reference time using a global position system (GPS) while the MS 10 synchronizes its time with the time of the BTS 20 using the time information transmitted from the BTS 20.

Accordingly, the reference time of the MS 10 is determined by the propagation delay time that it takes for the time information to be transmitted from the BTS 20 to the MS 10. The delay time depends on environment and a distance between the MS 10 and the BTS 20.

Figure 1:
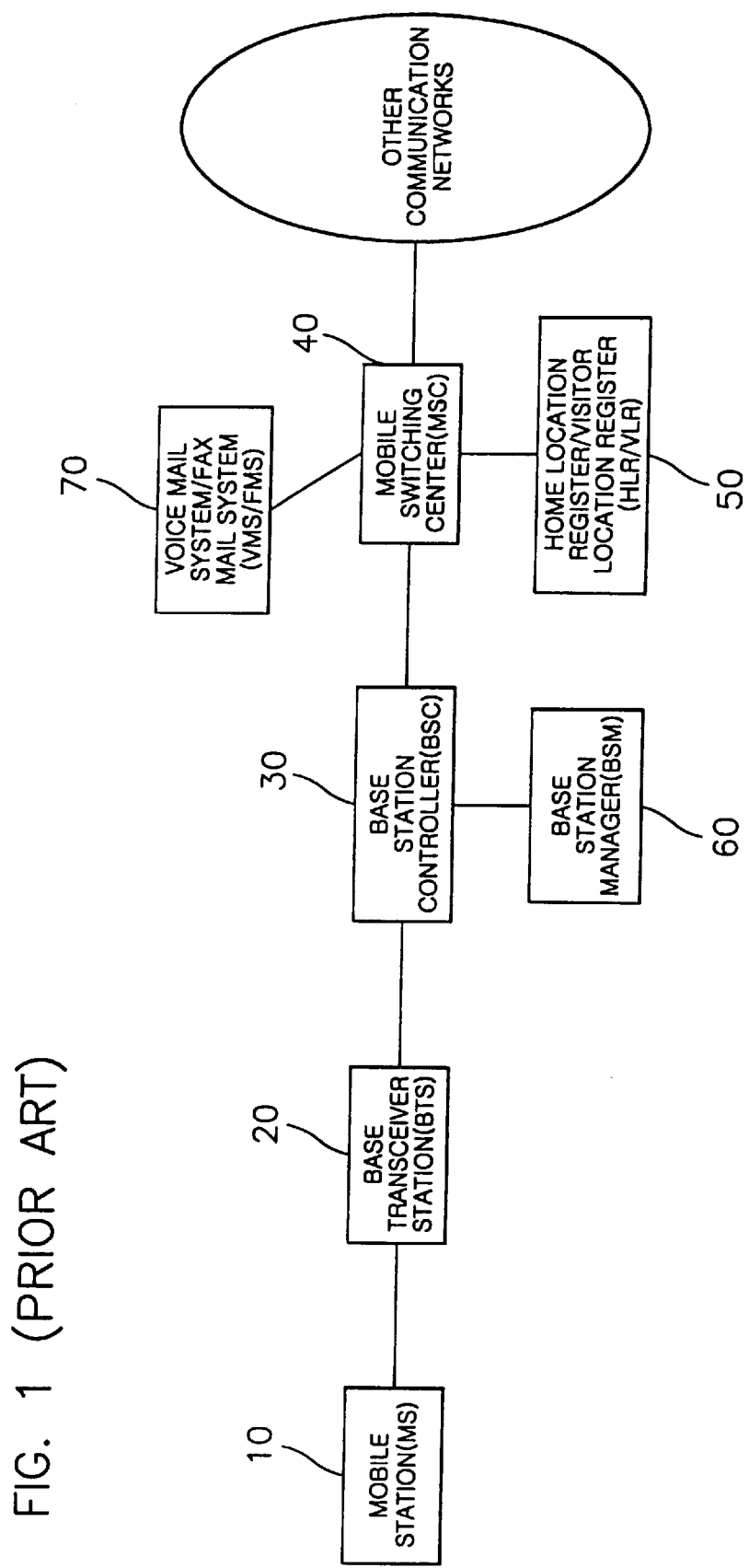
FIG. 1 is a block diagram of a conventional CDMA mobile communication system.
Figure 2:
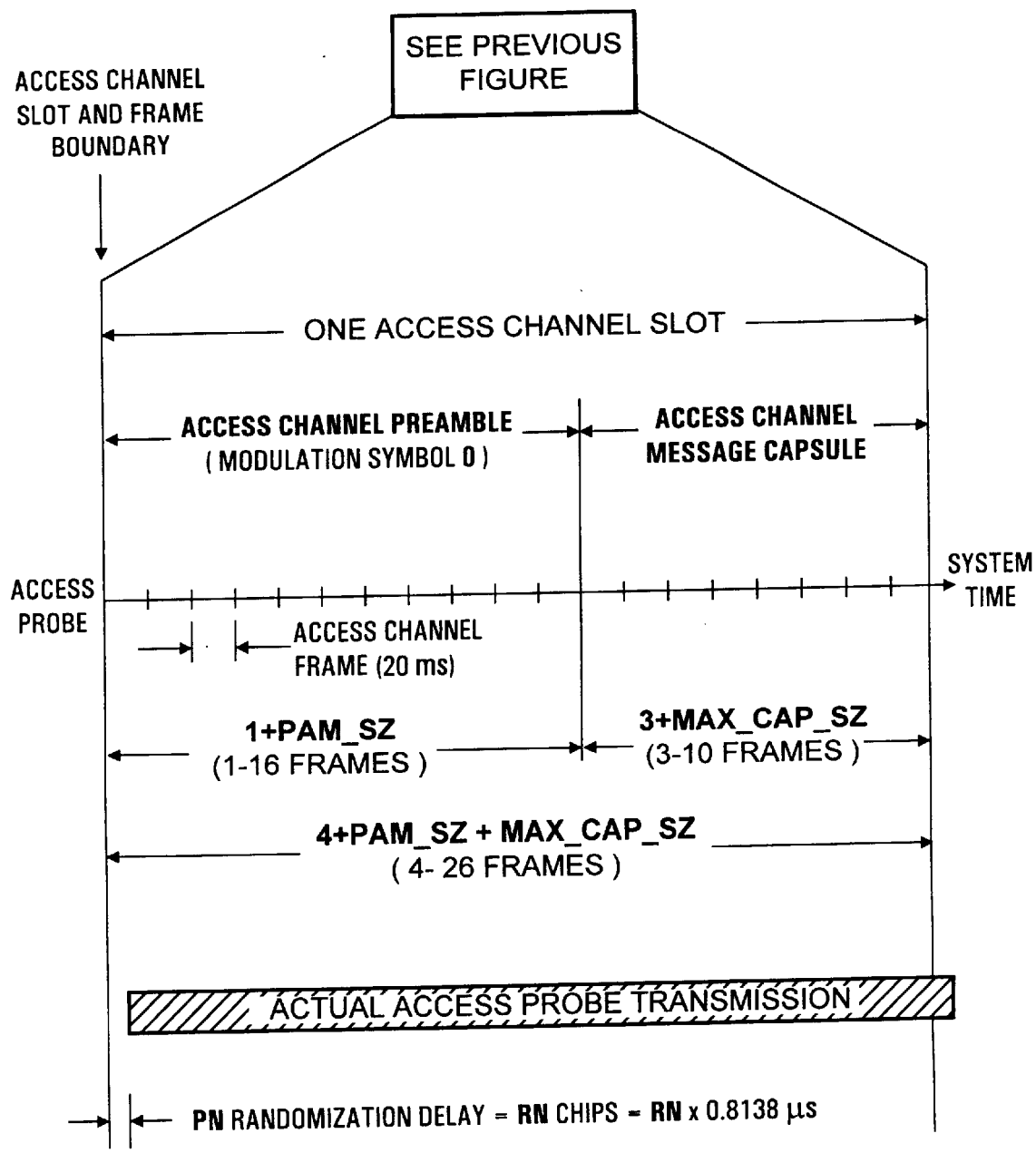
FIG. 2 shows a structure of an access channel used in a conventional CDMA mobile communication system.

The MS 10, as shown in FIG. 2, uses an access channel to access to the BTS system within a coverage area. The access channel is used when the MS 10 registers in the BTS 20 or requests a call of the BTS 20 via a reverse channel and consists of the unit of an access channel slot. An access channel message is allocated to a single access channel slot. The access channel message consists of minimum 4 frames (a frame is about 20 ms long) to maximum 26 frames according to its volume and a proper value is used according to a system. Messages frames of the access channel message are transmitted at a time point when the slot starts, and the next message is not transmitted until a relevant slot starts, so a boundary of the access channel slot is in accord with a boundary of the frames. A start of a zero offset pseudo number (PN) sequence is set to be synchronized with a start of an even second, so the frame boundary agrees with an even second boundary of the time information (system time) provided by the BTS 20.

When the MS 10 attempts to access to the BTS system within the coverage area, it transmits an origination message using the access channel. In this case, a single access channel slot is used for a transmission of the origination message. The origination message contains information on the relevant MS 10 (a terminal number, a mode indicating that the MS 10 is in a dedicated mode for the CDMA or a dual mode, a class indicating that the MS 10 is the PCS or a cellular phone) and a destination number. When the MS 10 receives an acknowledgement response to the origination message, which the MS 10 transmits via the access channel to the BTS 20, from the system (BTS 20) within a predetermined period of time, which is determined by adding Acc_Tmo (acknowledgement timeout) and a probe backoff contained in an access parameter message transmitted from the BTS 20 to the MS 10, the attempt of system access is successfully completed. When the MS 10 does not receive the acknowledgement signal from the system (BTS 20) within the predetermined period of time, the MS 10 retransmits the origination message and waits for the acknowledgement response. The MS 10 does not receive the acknowledgement at this time either, it continually transmits the origination message. The number of times of retransmissions is determined by summing Num_Step (the number of step) and Max_Req_Seq (maximum number of access probe sequence) contained in the access parameter message transmitted from the BTS 20 to the MS 10. When the MS 10 does not receive the acknowledgement signal from the system even after performing retransmissions as many as the prescribed number of times, the system access ends in failure.

The BTS 20 continually monitors the access channel since the MS 10 can attempt the access at any time. The MS 10 transmits the message using the access channel slot, so it is useless to search the access signal all the time. It is most appropriate to search the access signal of the MS 10 within a certain range of time that the access signal of the MS 10 can reach, on the basis of the frame boundaries at every 20 ms, in order to acquire the signal of the MS 10. This range of time that the BTS 20 searches to acquire the access signal of the MS 10 is called a search window.

The search window is determined considering the propagation delay according to the service radius of the BTS 20 and a basic process delay. The service radius of the BTS 20 is determined at a stage of designing and optimizing the BTS 20. The service radius of the BTS 20 can be appropriately adjusted according to environment or other ambient BTS and population density. The BTS 20 which is set up in a region having a large population and many buildings will have a small service radius (for example, 1 to 3 km). On the other hand, the BTS 20 which is set up in a region having a small population and a few buildings will have a large service radius (for example, 20 to 30 km).

FIG. 3 shows processes of establishing a size of a search window for a preamble according to each BTS service radius determined through the above.

Primarily, a service radius of the BTS 20 is determined (ST1).

A search range and a size of the search window for the preamble are read in accordance with the determined service radius from a table, as shown in FIG. 4, referring to sizes of preamble search windows according to service radiuses (ST2).

To make the search window size reference table as shown in FIG. 4, the bothway propagation delay, a process delay of the MS 10, and a PN offset should be considered.

The following description concerns why various factors should be considered to determine the size of the search window and how values of the various factors are established.

A range of a time when the BTS 20 receives an access signal from the MS 10 can be calculated as follows. The BTS 20 may receive the access signal from the MS 10 at the earliest time when the MS 10 is close to the BTS 20 (under the condition that there is no radio propagation delay). The earliest time when the BTS 20 receives the access signal from the MS 10 is determined by the sum of a transmission delay of the BTS 20, a process delay of the MS 10, and a receive delay of the BTS 20. The BTS 20 may receive the access signal from the MS 10 at the latest time when the MS 10 is located at the most outer place in a service area of the BTS 20. In this case, the time when the BTS 20 receives the access signal from the MS 10 is determined by adding "radio propagation delay*2" to the earliest time point. The reason why double the radio propagation delay is added is that the MS 10 sends the signal to the BTS 20 on the basis of the time information of the BTS 20. The time obtained by the MS 10 is determined by the delay from the BTS 20 to MS 10. Consequently, a time when the signal reaches the BTS 20 when the MS 10 attempts to access to the BTS 20 is determined by the sum of a delay time that it takes for the time information to be transmitted from the BTS 20 to the MS 10 and a delay time that it takes for the signal to be transmitted from the MS 10 to the BTS 20. For this reason, the radio propagation delay is called a round trip delay (RTD).

Therefore, by putting a start point of the search window to the earliest time point and an end of the search window to the latest time point, the BTS 20 is able to optimally search the signal of the MS 10.

The service radius of the BTS 20 is greatly various according to a design of a radio network and regional characteristics. When designing the radio network, the service radius of the BTS 20 is restricted by geographical features, population density, and arrangement of constructions in a relevant region. The service radius of the BTS 20 is determined at the stage of designing and optimizing the BTS 20. In a region having a large population and many constructions, a small service radius is set up for the BTS 20. On the other hand, a large service radius is set up for the BTS 20 in a region having a small population and a few constructions. A region where population density is high and many tall buildings are scattered is usually called an urban, and a region where population density is low and tall buildings are few is called a rural. A region between the urban and rural is defined as a suburban. The service radius of the BTS 20 in the urban is usually 2 to 4 km. The service radius of the BTS 20 in the suburban is usually 5 to 8 km. The service radius of the BTS 20 in the rural is usually over 10 km. Parameters of the system are modified to set the end of the search window considering the radio propagation delay changing according to the service radius of the BTS 20, so the size of the search window is adjusted (ST3), thereby getting rid of unnecessary search time used for a section where the access signal of the MS 10 can reach.

Since the start point and the size of the search window are managed by each BTS 20, they can be modified by changing parameter values of BTS configuration data base (PLD: program loading data) in accordance with the service radius of the relevant BTS 20. The changed data base (PLD) is loaded onto the BTS 20 and, in turn, the BTS 20 reads the values and sets the size of the search window for acquiring the access channel of the MS 10.

FIG. 4 is a table showing results of calculation of sizes and start points of search windows based upon service radiuses according to the present invention.

As shown in FIG. 4, since the signal of the MS 10 does not reach before an absolute time, the start point of the search window is determined by a preamble PN offset, and the end point of the search window is determined by "preamble PN offset+preamble window size". The calculation for setting up the search window is performed under the condition that the transmission delay of the BTS 20 is 0 microsecond, the process delay of the MS 10 is 1 microsecond, and the receive delay of the BTS 10 is 25 microseconds, so the start point of the search window is 26. In a general digital mobile cellular telecommunication system employing the CDMA mode, 1 PN chip is $(1228800\ Hz)^{-1}=814$ ns. In the CDMA system, a unit for the search window is ⅛ PN chips, so the start point of the search window (preamble PN offset) is 260.

When the service radius of the BTS 20 is 10 km, as shown in FIG. 4, the RTD is (10 km/propagation rate)*2=33.33*2 µsec=66.66 µsec, and this value corresponds to 81.9 PN chip. A transmit and receive delay of the BTS 20 and a terminal is 26 µsec (usually, 21 to 26 µsec), and this value corresponds to 31.98 PN chip. As a result, a total delay is 81.9 PN chip+31.98 PN chip=113.9 PN chip. If the total delay is calculated in terms of ⅛ PN chip, it is 911.2 ⅛ PN chip. The size of the preamble search window is obtained by subtracting the initial PN offset (in this embodiment, it is set to 260 ⅛ PN chip) from the 911.2. Finally, the size of the preamble search window is 651.

Such calculation is performed every 1 km with respect to the service radius of 1 km up to 30 km in the table depicted in FIG. 4. The calculation results depicted in FIG. 4 are obtained without consideration of allowances. Since there may not exist any direct path, it is preferable to permit allowance of □ 100 for the size of the preamble search window when actually applying the table to the system.

After setting up the search window through such method, whether or not the search window is appropriately set up, namely whether or not signals from all MS 10 within the service radius are exactly acquired using the search window set up according to the service radius, can be checked in such a manner that a tester carrying with the MS 10 checks whether or not the MS 10 succeeds in access to the BTS 20 while moving within the service radius (ST4).

As a result of the check, if there are any sections where a call is not successfully made within the service radius, the progress should return to the step of determining the service radius (ST1) to newly establish the service radius. When newly establishing the service radius, the system parameters should also be changed to adjust the search window. When it is determined that the service radius of the BTS 20 is appropriate, the BTS 20 acquires the signal of the MS 10 via the search window set up using the changed parameters at the step ST3.

As described above, the present invention determines a minimum serviceable radius by adjusting the start point of the search window and a maximum serviceable radius by adjusting the end point of the search window and adjusts the size of the search window according to the service radius and based upon the determined limit values, thereby improving efficiency in acquiring the access signal of the MS and allowing adjustment of the service area.

According to the BTS search window adjustment method of the present invention, the start point and the size of the search window can be adjusted according to the service radius of the BTS, allowing for the BTS to optimally acquire the access signal of the MS, thereby improving service quality.

Additionally, the minimum serviceable radius can be determined by adjusting the start point of the search window and the maximum serviceable radius can be determined by adjusting the end point of the search window, thereby allowing control over the service area of the BTS.

It will be apparent to those skilled in the art that various modifications and variations can be made in a method of adjusting a size of a search window for a BTS of the present invention without deviating from the spirit or scope of the invention. Thus, it is intended that the present invention cover the modifications and variations of this invention provided they come within the scope of the appended claims and their equivalents.

What is claimed is:

1. A method of adjusting a size of a search window for a base transceiver station (BTS), the method comprising the steps of:

determining a service radius in which the BTS can acquire an access signal of a mobile station;

reading a size of a preamble search window and a preamble search range corresponding to the determined service radius from a table used for determination of the size of the search window, the table being stored in a database; and modifying the size of the search window by changing search window parameters of the BTS system according to the read search range and the size of the search window for the preamble.

2. A method according to claim 1, wherein said search range is established in such a manner that a start point of said search window is set to an earliest time determined by a sum of a transmission delay of the BTS, a process delay of the mobile station, and a receive delay of the BTS, and an end point of said search window is set to a latest time determined by adding "radio propagation delay*2" to the earliest time.

3. A method according to claim 1, wherein said size of the search window is established in such a manner of determining a minimum serviceable radius by adjusting a start point of said search window, whereby a service area of the BTS is adjusted in accordance with the determined minimum radius.

4. A method according to claim 1, wherein the size of said search window is established in such a manner of determining a maximum serviceable radius by adjusting an end point of said search window, whereby a service area of the BTS is adjusted in accordance with the determined maximum radius.

5. A method according to claim 1, wherein said table for referring to the size of the search window in accordance with the service radius is stored at data memory in a base station manager in advance.

* * * * *